United States Patent
Sham

(10) Patent No.: US 9,578,137 B1
(45) Date of Patent: Feb. 21, 2017

(54) SYSTEM FOR ENHANCING SCRIPT EXECUTION PERFORMANCE

(71) Applicant: Amazon Technologies, Inc., Reno, NV (US)

(72) Inventor: Ivan King Yu Sham, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 924 days.

(21) Appl. No.: 13/917,402

(22) Filed: Jun. 13, 2013

(51) Int. Cl.
| | |
|---|---|
| *G06F 15/16* | (2006.01) |
| *H04L 29/06* | (2006.01) |
| *H04L 29/08* | (2006.01) |
| *G06F 17/30* | (2006.01) |
| *G06F 11/30* | (2006.01) |

(52) U.S. Cl.
CPC ........... *H04L 67/42* (2013.01); *G06F 11/3082* (2013.01); *G06F 17/30412* (2013.01); *H04L 29/08765* (2013.01)

(58) Field of Classification Search
CPC ............ G06F 11/3082; G06F 17/30412; H04L 29/08765
See application file for complete search history.

(56) References Cited

U.S. PATENT DOCUMENTS

| | | | |
|---|---|---|---|
| 5,634,064 A | 5/1997 | Warnock et al. | |
| 5,872,850 A | 2/1999 | Klein et al. | |
| 5,961,593 A | 10/1999 | Gabber et al. | |
| 6,049,812 A | 4/2000 | Bertram et al. | |
| 6,108,637 A | 8/2000 | Blumenau | |
| 6,138,156 A | 10/2000 | Fletcher et al. | |
| 6,144,991 A | 11/2000 | England | |
| 6,195,679 B1 | 2/2001 | Bauersfeld et al. | |
| 6,282,542 B1 | 8/2001 | Carneal et al. | |
| 6,430,624 B1 | 8/2002 | Jamtgaard et al. | |
| 6,438,597 B1 | 8/2002 | Mosberger et al. | |
| 6,513,061 B1 | 1/2003 | Ebata et al. | |
| 6,549,941 B1 | 4/2003 | Jaquith et al. | |
| 6,560,620 B1 | 5/2003 | Ching | |
| 6,560,705 B1 | 5/2003 | Perlman et al. | |
| 6,625,624 B1 | 9/2003 | Chen et al. | |
| 6,704,024 B2 | 3/2004 | Robotham et al. | |
| 6,704,204 B1 | 3/2004 | Eskildsen et al. | |
| 6,785,864 B1 | 8/2004 | Te et al. | |
| 6,842,777 B1 | 1/2005 | Tuli | |
| 6,871,236 B2 | 3/2005 | Fishman et al. | |
| 6,931,439 B1 | 8/2005 | Hanmann et al. | |

(Continued)

OTHER PUBLICATIONS

Amazon Gives Virtual Private Clouds Internet Access, available at http://web2.sys-con.com/node/1759026/, Mar. 2011.

(Continued)

*Primary Examiner* — Arvin Eskandarnia
(74) *Attorney, Agent, or Firm* — Knobbe, Martens, Olson & Bear, LLP

(57) ABSTRACT

Systems and methods can optimize or attempt to optimize portions of scripts that might be overlooked by traditional compilers. These systems and methods can include a code analysis module that develops an aggregate execution profile for a script by aggregating individual execution profiles of a plurality of users. These systems and methods can use the aggregate execution profile to emphasize aspects of the script that can be optimized for a plurality of users, enabling improved script performance for users.

20 Claims, 10 Drawing Sheets

(56) References Cited

U.S. PATENT DOCUMENTS

| | | |
|---|---|---|
| 6,944,665 B2 | 9/2005 | Brown et al. |
| 6,963,850 B1 | 11/2005 | Bezos et al. |
| 6,976,059 B1 | 12/2005 | Rogalski et al. |
| 7,003,442 B1 | 2/2006 | Tsuda |
| 7,051,084 B1 | 5/2006 | Hayton et al. |
| 7,054,952 B1 | 5/2006 | Schwerdtfeger et al. |
| 7,082,476 B1 | 7/2006 | Cohen et al. |
| 7,085,736 B2 | 8/2006 | Keezer et al. |
| 7,085,753 B2 | 8/2006 | Weiss et al. |
| 7,089,316 B2 | 8/2006 | Andersen et al. |
| 7,159,023 B2 | 1/2007 | Tufts |
| 7,171,478 B2 | 1/2007 | Lueckhoff et al. |
| 7,191,211 B2 | 3/2007 | Tuli |
| 7,260,841 B2 | 8/2007 | Tenereillo |
| 7,353,252 B1 | 4/2008 | Yang et al. |
| 7,373,313 B1 | 5/2008 | Kahle et al. |
| 7,409,719 B2 | 8/2008 | Armstrong et al. |
| 7,441,045 B2 | 10/2008 | Skene et al. |
| 7,448,079 B2 | 11/2008 | Tremain |
| 7,543,059 B2 | 6/2009 | Johnson et al. |
| 7,792,944 B2 | 9/2010 | DeSantis et al. |
| 7,831,582 B1 | 11/2010 | Scofield et al. |
| 7,865,528 B2 | 1/2011 | Neil |
| 7,890,528 B1 | 2/2011 | Khoshnevisan |
| 7,941,450 B2 | 5/2011 | Hulaj et al. |
| 7,975,000 B2 | 7/2011 | Dixon et al. |
| 7,991,859 B1 | 8/2011 | Miller et al. |
| 7,996,912 B2 | 8/2011 | Spalink et al. |
| 8,010,545 B2 | 8/2011 | Stefik et al. |
| 8,010,679 B2 | 8/2011 | Low et al. |
| 8,015,343 B2 | 9/2011 | Garman et al. |
| 8,015,496 B1 | 9/2011 | Rogers |
| 8,051,166 B1 | 11/2011 | Baumback et al. |
| 8,051,180 B2 | 11/2011 | Mazzaferri et al. |
| 8,060,463 B1 | 11/2011 | Spiegel |
| 8,073,850 B1 | 12/2011 | Hubbard et al. |
| 8,103,742 B1 | 1/2012 | Green |
| 8,117,314 B2 | 2/2012 | Croft et al. |
| 8,171,085 B1 | 5/2012 | Tevanian, Jr. |
| 8,185,621 B2 | 5/2012 | Kasha |
| 8,190,682 B2 | 5/2012 | Paterson-Jones et al. |
| 8,195,767 B2 | 6/2012 | Albrecht et al. |
| 8,209,623 B2 | 6/2012 | Barletta et al. |
| 8,224,964 B1 | 7/2012 | Fredrickson et al. |
| 8,249,904 B1 | 8/2012 | DeSantis et al. |
| 8,271,887 B2 | 9/2012 | Offer et al. |
| 8,316,124 B1 | 11/2012 | Baumback et al. |
| 8,336,049 B2 | 12/2012 | Medovich |
| 8,839,200 B1 * | 9/2014 | Roskind .............. G06F 11/3644 717/127 |
| 2001/0039490 A1 | 11/2001 | Verbitsky et al. |
| 2001/0051996 A1 | 12/2001 | Cooper et al. |
| 2001/0052006 A1 | 12/2001 | Barker et al. |
| 2002/0026511 A1 | 2/2002 | Garcia-Luna-Aceves et al. |
| 2002/0030703 A1 | 3/2002 | Robertson et al. |
| 2002/0107985 A1 | 8/2002 | Hwang et al. |
| 2002/0184493 A1 | 12/2002 | Rees |
| 2002/0194302 A1 | 12/2002 | Blumberg |
| 2003/0004882 A1 | 1/2003 | Holler et al. |
| 2003/0005041 A1 | 1/2003 | Ullmann et al. |
| 2003/0014478 A1 | 1/2003 | Noble |
| 2003/0023712 A1 | 1/2003 | Zhao et al. |
| 2003/0041106 A1 | 2/2003 | Tuli |
| 2003/0046335 A1 | 3/2003 | Doyle et al. |
| 2003/0208570 A1 | 11/2003 | Lapidous |
| 2003/0233621 A1 | 12/2003 | Paolini et al. |
| 2004/0010543 A1 | 1/2004 | Grobman |
| 2004/0030887 A1 | 2/2004 | Harrisville-Wolff et al. |
| 2004/0066397 A1 | 4/2004 | Walker et al. |
| 2004/0083294 A1 | 4/2004 | Lewis |
| 2004/0098463 A1 | 5/2004 | Shen et al. |
| 2004/0139208 A1 | 7/2004 | Tuli |
| 2004/0143579 A1 | 7/2004 | Nakazawa |
| 2004/0181613 A1 | 9/2004 | Hashimoto et al. |
| 2004/0205448 A1 | 10/2004 | Grefenstette et al. |
| 2004/0220905 A1 | 11/2004 | Chen et al. |
| 2004/0228335 A1 | 11/2004 | Park et al. |
| 2004/0243622 A1 | 12/2004 | Morisawa |
| 2004/0260767 A1 | 12/2004 | Kedem et al. |
| 2005/0010863 A1 | 1/2005 | Zernik |
| 2005/0027815 A1 | 2/2005 | Christodoulou et al. |
| 2005/0060643 A1 | 3/2005 | Glass et al. |
| 2005/0138382 A1 | 6/2005 | Hougaard et al. |
| 2005/0183039 A1 | 8/2005 | Revis |
| 2005/0188361 A1 | 8/2005 | Cai et al. |
| 2005/0246193 A1 | 11/2005 | Roever et al. |
| 2006/0031774 A1 | 2/2006 | Gaudette |
| 2006/0085766 A1 | 4/2006 | Dominowska et al. |
| 2006/0095336 A1 | 5/2006 | Heckerman et al. |
| 2006/0122889 A1 | 6/2006 | Burdick et al. |
| 2006/0123092 A1 | 6/2006 | Madams et al. |
| 2006/0161535 A1 | 7/2006 | Holbrook |
| 2006/0168510 A1 | 7/2006 | Bryar et al. |
| 2006/0184421 A1 | 8/2006 | Lipsky et al. |
| 2006/0248195 A1 | 11/2006 | Toumura et al. |
| 2006/0248442 A1 | 11/2006 | Rosenstein et al. |
| 2006/0277167 A1 | 12/2006 | Gross et al. |
| 2006/0280121 A1 | 12/2006 | Matoba |
| 2006/0294366 A1 | 12/2006 | Nadalin et al. |
| 2006/0294461 A1 | 12/2006 | Nadamoto et al. |
| 2007/0022072 A1 | 1/2007 | Kao et al. |
| 2007/0027672 A1 | 2/2007 | Decary et al. |
| 2007/0094241 A1 | 4/2007 | Blackwell et al. |
| 2007/0118740 A1 | 5/2007 | Deishi |
| 2007/0124693 A1 | 5/2007 | Dominowska et al. |
| 2007/0139430 A1 | 6/2007 | Korn et al. |
| 2007/0226044 A1 | 9/2007 | Hanson |
| 2007/0240160 A1 | 10/2007 | Paterson-Jones et al. |
| 2007/0288589 A1 | 12/2007 | Chen et al. |
| 2007/0288855 A1 | 12/2007 | Rohrbaugh et al. |
| 2008/0016040 A1 | 1/2008 | Jones et al. |
| 2008/0028334 A1 | 1/2008 | De Mes |
| 2008/0086264 A1 | 4/2008 | Fisher |
| 2008/0104502 A1 | 5/2008 | Olston |
| 2008/0134033 A1 | 6/2008 | Burns et al. |
| 2008/0148401 A1 | 6/2008 | Shen |
| 2008/0155691 A1 | 6/2008 | Fossen et al. |
| 2008/0183672 A1 | 7/2008 | Canon et al. |
| 2008/0183889 A1 | 7/2008 | Andreev et al. |
| 2008/0184128 A1 | 7/2008 | Swenson et al. |
| 2008/0189770 A1 | 8/2008 | Sachtjen |
| 2008/0222299 A1 | 9/2008 | Boodaei |
| 2008/0229025 A1 | 9/2008 | Plamondon |
| 2008/0291294 A1 * | 11/2008 | Cha .................... G06T 11/60 348/231.2 |
| 2008/0301225 A1 | 12/2008 | Kamura |
| 2008/0320225 A1 | 12/2008 | Panzer et al. |
| 2009/0012969 A1 | 1/2009 | Rail et al. |
| 2009/0013034 A1 | 1/2009 | Cheng et al. |
| 2009/0019372 A1 | 1/2009 | Chu et al. |
| 2009/0049443 A1 | 2/2009 | Powers et al. |
| 2009/0063854 A1 | 3/2009 | Parkinson |
| 2009/0164597 A1 | 6/2009 | Shuster |
| 2009/0164924 A1 | 6/2009 | Flake et al. |
| 2009/0204478 A1 | 8/2009 | Kaib et al. |
| 2009/0204964 A1 | 8/2009 | Foley et al. |
| 2009/0217199 A1 | 8/2009 | Hara et al. |
| 2009/0240717 A1 | 9/2009 | Mimatsu |
| 2009/0241191 A1 | 9/2009 | Keromytis et al. |
| 2009/0248680 A1 | 10/2009 | Kalavade |
| 2009/0254867 A1 | 10/2009 | Farouki et al. |
| 2009/0276488 A1 | 11/2009 | Alstad |
| 2009/0282021 A1 | 11/2009 | Bennett |
| 2009/0287698 A1 | 11/2009 | Marmaros et al. |
| 2009/0327914 A1 | 12/2009 | Adar et al. |
| 2010/0027552 A1 | 2/2010 | Hill |
| 2010/0036740 A1 | 2/2010 | Barashi |
| 2010/0042724 A1 | 2/2010 | Jeon et al. |
| 2010/0057639 A1 | 3/2010 | Schwarz et al. |
| 2010/0070569 A1 | 3/2010 | Turakhia |
| 2010/0070849 A1 | 3/2010 | Sadan et al. |
| 2010/0125507 A1 | 5/2010 | Tarantino, III et al. |
| 2010/0131594 A1 | 5/2010 | Kashimoto |
| 2010/0131646 A1 | 5/2010 | Drako |

(56) References Cited

U.S. PATENT DOCUMENTS

| | | |
|---|---|---|
| 2010/0138293 A1 | 6/2010 | Ramer et al. |
| 2010/0144314 A1 | 6/2010 | Sherkin et al. |
| 2010/0161754 A1 | 6/2010 | Davis |
| 2010/0198742 A1 | 8/2010 | Chang et al. |
| 2010/0218106 A1 | 8/2010 | Chen et al. |
| 2010/0235473 A1 | 9/2010 | Koren et al. |
| 2010/0281112 A1 | 11/2010 | Plamondon |
| 2010/0293190 A1 | 11/2010 | Kaiser et al. |
| 2010/0312788 A1 | 12/2010 | Bailey |
| 2010/0313149 A1 | 12/2010 | Zhang et al. |
| 2010/0318892 A1 | 12/2010 | Teevan et al. |
| 2010/0325239 A1 | 12/2010 | Khedouri et al. |
| 2010/0325287 A1 | 12/2010 | Jagadeeswaran et al. |
| 2010/0332513 A1 | 12/2010 | Azar et al. |
| 2011/0022957 A1 | 1/2011 | Lee |
| 2011/0029854 A1 | 2/2011 | Nashi et al. |
| 2011/0055203 A1 | 3/2011 | Gutt et al. |
| 2011/0055398 A1 | 3/2011 | DeHaan et al. |
| 2011/0066982 A1 | 3/2011 | Paulsami et al. |
| 2011/0072502 A1 | 3/2011 | Song et al. |
| 2011/0078140 A1 | 3/2011 | Dube et al. |
| 2011/0078705 A1 | 3/2011 | Maclinovsky et al. |
| 2011/0119352 A1 | 5/2011 | Perov |
| 2011/0119661 A1 | 5/2011 | Agrawal et al. |
| 2011/0161849 A1 | 6/2011 | Stallings et al. |
| 2011/0173177 A1 | 7/2011 | Junqueira et al. |
| 2011/0173637 A1 | 7/2011 | Brandwine et al. |
| 2011/0178868 A1 | 7/2011 | Garg et al. |
| 2011/0185025 A1 | 7/2011 | Cherukuri et al. |
| 2011/0191327 A1 | 8/2011 | Lee |
| 2011/0197121 A1 | 8/2011 | Kletter |
| 2011/0208822 A1 | 8/2011 | Rathod |
| 2011/0208840 A1 | 8/2011 | Blackman |
| 2011/0212717 A1 | 9/2011 | Rhoads et al. |
| 2011/0214082 A1 | 9/2011 | Osterhout et al. |
| 2011/0246873 A1 | 10/2011 | Tolle et al. |
| 2011/0261828 A1 | 10/2011 | Smith |
| 2011/0271175 A1 | 11/2011 | Lavi et al. |
| 2011/0289074 A1 | 11/2011 | Leban |
| 2011/0289157 A1 | 11/2011 | Pirnazar |
| 2011/0296341 A1 | 12/2011 | Koppert |
| 2011/0296503 A1 | 12/2011 | Shull et al. |
| 2011/0302510 A1 | 12/2011 | Harrison et al. |
| 2011/0320598 A1 | 12/2011 | Solin |
| 2011/0321139 A1 | 12/2011 | Jayaraman et al. |
| 2012/0005600 A1 | 1/2012 | Ito |
| 2012/0022942 A1 | 1/2012 | Holloway et al. |
| 2012/0030460 A1 | 2/2012 | Chang |
| 2012/0054316 A1 | 3/2012 | Piazza et al. |
| 2012/0054869 A1 | 3/2012 | Yen et al. |
| 2012/0066502 A1 | 3/2012 | Borneman et al. |
| 2012/0066586 A1 | 3/2012 | Shemesh |
| 2012/0072821 A1 | 3/2012 | Bowling |
| 2012/0084433 A1 | 4/2012 | Bar-Caspi et al. |
| 2012/0084644 A1 | 4/2012 | Robert et al. |
| 2012/0096365 A1 | 4/2012 | Wilkinson et al. |
| 2012/0110017 A1 | 5/2012 | Gu et al. |
| 2012/0117565 A1 | 5/2012 | Staelin et al. |
| 2012/0117649 A1 | 5/2012 | Holloway et al. |
| 2012/0137201 A1 | 5/2012 | White et al. |
| 2012/0143944 A1 | 6/2012 | Reeves et al. |
| 2012/0144288 A1 | 6/2012 | Caruso et al. |
| 2012/0150844 A1 | 6/2012 | Lindahl et al. |
| 2012/0166922 A1 | 6/2012 | Rolles |
| 2012/0192220 A1 | 7/2012 | Wyatt et al. |
| 2012/0198020 A1 | 8/2012 | Parker et al. |
| 2012/0198516 A1 | 8/2012 | Lim |
| 2012/0203904 A1 | 8/2012 | Niemela et al. |
| 2012/0210233 A1 | 8/2012 | Davis et al. |
| 2012/0215833 A1 | 8/2012 | Chen et al. |
| 2012/0215834 A1 | 8/2012 | Chen et al. |
| 2012/0215919 A1 | 8/2012 | Labat et al. |
| 2012/0216035 A1 | 8/2012 | Leggette et al. |
| 2012/0254402 A1 | 10/2012 | Panidepu et al. |
| 2012/0284629 A1 | 11/2012 | Peters et al. |
| 2012/0297341 A1 | 11/2012 | Glazer et al. |
| 2012/0317295 A1 | 12/2012 | Baird et al. |
| 2012/0324043 A1 | 12/2012 | Burkard et al. |
| 2012/0331406 A1 | 12/2012 | Baird et al. |
| 2013/0007102 A1 | 1/2013 | Trahan et al. |
| 2013/0031461 A1 | 1/2013 | Hou et al. |
| 2013/0051686 A1 | 2/2013 | Bennett |
| 2013/0080611 A1 | 3/2013 | Li et al. |
| 2013/0097380 A1 | 4/2013 | Colgrove et al. |
| 2013/0103785 A1 | 4/2013 | Lyon |
| 2013/0185715 A1 | 7/2013 | Dunning et al. |
| 2013/0254652 A1 | 9/2013 | Chinosornvatana et al. |
| 2014/0181803 A1* | 6/2014 | Cooper .................... G06F 8/60 717/178 |
| 2016/0132547 A1* | 5/2016 | Hong .................. G06F 21/6209 707/690 |

OTHER PUBLICATIONS

Acharya et al., Balancing Push and Pull for Data Broadcast, Proceedings of ACM SIGMOD Conference, May 1997, pp. 1-12, Tucson, AZ.

Acharya et al., Prefetching from a Broadcast Disk, Proceedings of the International Conference on Data Engineering, Feb. 1996, New Orleans, LA.

Amazon Gives Virtual Private Clouds Internet Access, available at http://web2.sys-con.com/node/1759023/, Mar. 2011.

Bango, Rey "How JS & Ajax work in Opera Mini 4", Nov. 2, 2007, XP055050107, Retrieved from the Internet.

Baumann, A., et al., Enhancing STEM Classes Using Weave: A Collaborative Web-Based Visualization Environment, Integrated Stem Education Conference Apr. 2, 2011, pp. pp. 2A-1-2A-4, Ewing, New Jersey.

Bestavros et al., Server-initiated Document Dissemination for the WWW, IEEE Data Engineering Bulletin, Sep. 1996, vol. 19, Issue 3, pp. 3-11, Boston, MA.

Brinkmann, M., "Record and Share your browser history with Hooeey," ghacks.net, Feb. 26, 2008, 6 pages, printed on Jan. 25, 2013.

Brooks et al., Application-Specific Proxy Servers as HTTP Stream Transducers, Dec. 1995, pp. 1-7.

Chen, H., et al., Bringing Order to the Web: Automatically Categorizing Search Results, Proceedings of the SIGCHI Conference on Human Factors in Computing Systems, Apr. 2000, pp. 145-152.

Chinen et al., An Interactive Prefetching Proxy Server for Improvement of WWW Latency, Jun. 1997, pp. 1-10.

Considine, A., The Footprints of Web Feet, The New York Times, accessed Jan. 25, 2013, Mar. 4, 2011, pp. 3.

Curewitz et al., Practical Prefetching via Data Compression, SIGMOD Conference, 1993, pp. 10, San Diego, CA.

De Carvalho, L.G., et al., Synchronizing Web Browsing Data With Browserver, Proceedings of the IEEE Symposium on Computers and Communications, Jun. 22-25, 2010, Riccione, Italy, pp. 738-743.

Dias et al., A Smart Internet Caching System, 1996, pp. 1-12, Moratuwa, Sri Lanka.

EyeBrowse: Record, Visualize and Share your Browser History, Information Aesthetics, Sep. 18, 2009, 2 pages, printed on Jan. 25, 2013.

Feuerstein, A., Flyswat Takes Aim, San Francisco Business Times, printed from http://www.bizjournals.com/sanfrancisco/stories/1999/10/25/story2.html?t=printable, Oct. 22, 1999, pp. 2.

Franklin et al., Dissemination-Based Information Systems, IEEE Data Engineering Bulletin, Sep. 1996, vol. 19, Issue 3, pp. 1-9.

Gabber, et al., "How to Make Personalized Web Browsing Simple, Secure, and Anonymous," Financial Cryptography, 16 pages (1997).

Gingerich, J., Keycorp Making Site Into Portal, KRTBN Knight-Ridder Tribune Business News (South Bend Tribune, Indiana), Oct. 25, 1999, pp. 2.

Gulbrandsen et al., "A DNS RR for specifying the location of services (DNS SRV)", RFC 2782, 12 pages, Feb. 2000.

(56) References Cited

OTHER PUBLICATIONS

Hopper, D.I., Desktops Now Have Power to Comparison-Shop, http://www.cnn.com/TECH/computing/9910/18/r.u.sure/index.html, accessed Oct. 18, 1999, pp. 3.

Inoue et al., An Adaptive WWW Cache Mechanism in the AI3 Network, 1997, pp. 1-9.

Kevin, Close 'n' Forget Firefox add on, Evilfantasy's Blog, Retrieved from the Internet: URL: http://evilfantasy.wordpress.com/2009/03/24/close-%E2%80%98n%E2%80%99-forget-firefox-add-on/ [retrieved on Feb. 7, 2013]., Mar. 24, 2009.

Malik et al., "Virtual Cloud: Rent Out the Rented Resources", 6th International Conference on Internet Technology and Secured Transactions, Dec. 2011.

Mockapetris, "Domain Names—Implementation and Specification", RFC 1035, 55 pages, Nov. 1987.

Opera Mini, http://en.wikipedia.org/wiki/Opera_mini, last modified on Mar. 7, 2013 at 10:31.

Padmanabhan et al., Using Predictive Prefetching to Improve World Wide Web Latency, Computer Communication Review, 1996, vol. 26, pp. 22-36.

Rao, H.C.-H., et al., A Proxy-Based Personal Web Archiving Service, Operating Systems Review, 2001, vol. 35, Issue 1, pp. 61-72.

RSS Ticker: Add-ons for Firefox, https://addons.mozilla.org/en-US/firefox/addon/rss-ticker/, accessed Feb. 7, 2013, pp. 3.

Shrikumar et al., Thinternet: Life at the End of a Tether, 1994, vol. 222-09.

Sullivan, Danny, "Google Search History Expands, Becomes Web History", http://searchengineland.com/google-search-history-expands-becomes-web-history-11016, Apr. 19, 2007, 12 pages.

Teevan, J., et al., Changing How People View Changes on the Web, , Proceedings of the 22nd Annual ACM Symposium on User Interface Software and Technology, 2009, pp. pp. 237-246, New York.

Van Kleek, M., Introducing "Eyebrowse"—Track and share your web browsing in real time, Haystack Blog, accessed Jan. 25, 2013, Aug. 28, 2009, pp. 3.

Wang et al., Prefetching in World Wide Web, Department of Computer Science, University College London, Nov. 18-22, 1996, London, UK.

\* cited by examiner

...

SYSTEM FOR ENHANCING SCRIPT EXECUTION PERFORMANCE

BACKGROUND

Generally described, computing devices and communication networks can be utilized to exchange information. In a common application, a computing device can request content from another computing device via the communication network. For example, a user at a personal computing device can utilize a software browser application, typically referred to as a browser software application, to request a Web page from a server computing device via the Internet. In such embodiments, the user computing device can be referred to as a client computing device and the server computing device can be referred to as a content provider.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices, such as a browser software application, typically processes embedded resource identifiers to generate requests for the content. Accordingly, in order to satisfy a content request, one or more content providers will generally provide client computing devices data associated with the Web page as well as the data associated with the embedded resources.

Once the client computing device obtains the Web page and associated additional resources, the content may be processed in a number of stages by the software browser application or other client computing device interface. For example, and with reference to the above illustration, the software browser application may parse the Web page to process various HyperText Markup Language (HTML) layout information and references to associated resources, may identify and process Cascading Style Sheets ("CSS") information, may process and instantiate various Javascript code associated with the Web page, may construct a native object model to represent one or more components of the Web page, and may calculate various layout and display properties of the processed content for presentation to a user.

BRIEF DESCRIPTION OF THE DRAWINGS

Throughout the drawings, reference numbers are re-used to indicate correspondence between referenced elements. The drawings are provided to illustrate embodiments of the features described herein and not to limit the scope thereof.

DETAILED DESCRIPTION

I. Introduction

Figure 1:
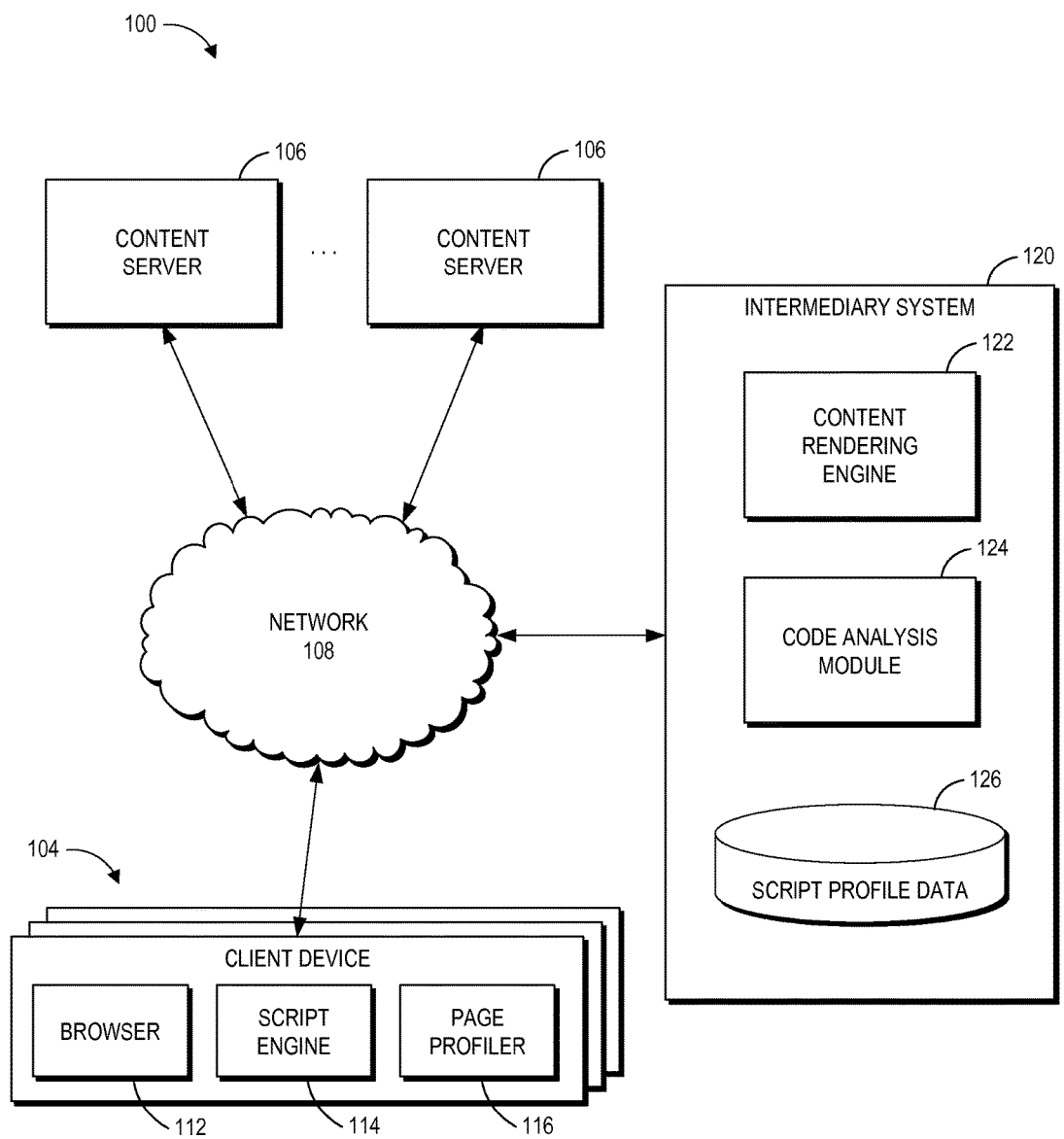
FIG. 1 depicts an embodiment of a content delivery environment that can facilitate script optimizations based on aggregate profile data.

From the perspective of a user utilizing a client computing device, a user experience can be defined in terms of the performance and latencies associated with obtaining network content over a communication network, such as obtaining a Web page, processing embedded resource identifiers, generating requests to obtain embedded resources, and rendering content on the client computing device. Latencies and performance limitations of any of the above processes may diminish the user experience. Additionally, latencies and inefficiencies may be especially apparent on computing devices with limited resources, such as processing power, memory or network connectivity such as netbooks, tablets, smartphones, and the like.

One approach to improving performance of loading content pages, such as web pages, is to attempt to optimize compilation of a script included in the content. An example of a script language in common use in many content pages is JavaScript. Scripts coded in JavaScript may be compiled into bytecode and interpreted, or they may be directly compiled. In either case, optimizations may be implemented at the compile stage to improve performance (e.g., faster execution speed) to facilitate faster load and/or execution times. An example of a compiler used to compile JavaScript is the V8 JavaScript Engine included in the Google Chrome™ web browser. The V8 JavaScript Engine includes a performance profiler that profiles a script to create an execution profile having information about execution times and frequency that methods in the script are executed. The V8 JavaScript Engine runs the performance profiler on a client device of a user to obtain the execution profile and may use this profile to identify methods that have a certain "hotness" level, meaning, among other things, that such methods may be executed frequently. The V8 JavaScript engine can optimize or attempt to optimize these methods, for example, by performing function inlining, elision of runtime properties, loop unrolling, inline caching, or other optimization techniques. A programmer can also use the execution profile information manually to improve or otherwise optimize a script.

A drawback to the optimization techniques of compilers such as the V8 JavaScript Engine compiler is that such compilers tend to optimize only those functions or methods that are executed frequently, while overlooking slowly-executing functions that execute infrequently. However, for a network resource site, such as a web site, a script in a content page may include a function that executes infrequently for each user that visits the site but that actually executes frequently when taken in the aggregate over many users. Such a function may be slow and cause degraded performance for many users, particularly users of mobile devices.

This disclosure describes embodiments of systems and methods that can optimize or attempt to optimize portions of scripts that might be overlooked by traditional compilers.

These systems and methods can include a code analysis module that develops an aggregate execution profile for a script by aggregating individual execution profiles of a plurality of users. These systems and methods can use the aggregate execution profile to emphasize aspects of the script that can be optimized for a plurality of users, enabling improved script performance for users.

As used herein, the term "optimize" and its derivatives, when referred to compilation or script execution techniques, in addition to having their ordinary meaning, are used herein to refer to improving one or more aspects of compilation or execution of a script (such as execution speed) and may, but need not, mean that a theoretically optimal or best compilation or execution of a script has been achieved. In addition, for convenience, script examples are described herein in the context of JavaScript, although other scripts in different script languages and scripting platforms may also take advantage of the features described herein, including, for example, VBScript, ActionScript/Flash, Silverlight, TypeScript, Dart, and the like. Further, although this disclosure focuses primarily on optimization of scripts, some or all of the features described herein may also be applied to computer program code other than scripts, including program code that is compiled into script code.

II. Example Content Delivery Environment

FIG. 1 illustrates an example content delivery environment 100 for delivering content to users. This content may include content pages, such as web pages or other electronic documents, mobile application content, or the like. The content pages may include any combination of text, images, videos, audio, animations, interactive features, and the like. The content may also include scripts embedded in or provided together with the content pages. The scripts can provide or enhance functionality of the content pages by, for example, enabling dynamic updating of content in the content pages. Advantageously, in certain embodiments, the content delivery environment 100 enables script optimizations to be performed based on aggregate profile data, as will be described in greater detail below.

The content delivery environment 100 can include an intermediary system 120, any number of client devices 104, and any number of content servers 106. The various systems may communicate with each other via a communication network 108. The network 108 may be a publicly accessible network of linked networks, possibly operated by various distinct parties, such as the Internet. In other embodiments, the network 108 may include a private network, personal area network, local area network, wide area network, cable network, satellite network, cellular telephone network, combinations of the same, or the like.

The intermediary system 120 can be any computing system that serves as an intermediary between a client device 104 and content servers 106 that serve the content. For example, the intermediary system 120 can be an intelligent proxy server, a system operated by an internet service provider (ISP), or some other device or group of devices that retrieve content on behalf of the client devices 104. The intermediary system 120 can include a number of components, such as a code analysis module 124, a content rendering engine 122, and a script profile data store 126. In some embodiments, the intermediary system 120 may include additional or fewer components than illustrated in FIG. 1. For example, the intermediary system 120 may include or otherwise be associated with various additional computing resources, such as content delivery network (CDN) systems, domain name system (DSN) servers, and the like.

The intermediary system 120 may include multiple computing devices, such as computer servers, logically or physically grouped together. The components of the intermediary system 120 can each be implemented as hardware, such as one or more server computing devices, or as a combination of hardware and software. In addition, the components of the intermediary system 120 can be combined on one server computing device or separated individually or into groups on several server computing devices. In some embodiments, the intermediary system 120 can include multiple instances of a single component, for example, implemented in virtual machines.

The client devices 104 can include a wide variety of computing devices, including personal computing devices, laptop computing devices, handheld computing devices, terminal computing devices, mobile devices (e.g., mobile phones, tablet computing devices, ebook readers, etc.), wireless devices, video game platforms, media players, and various other electronic devices and appliances. The client devices 104 may be configured with a browser application 112 to communicate via the network 108 with other computing systems, such the intermediary system 120 or content servers 106, and to request, receive, process, and display content. In addition, the client devices 104 can include a script engine 114 that interprets, compiles, or otherwise processes scripts included in the content. Moreover, the client devices 104 optionally include a page profiler 106 that can profile general user interactions with content pages. The page profiler 106 is described in greater detail below with respect to FIGS. 9 and 10.

The content servers 106 can each include one or more computing devices for hosting content and servicing requests for the hosted content over the network 112. For example, the content servers 106 can include a web server component that can obtain and process requests for content (such as content pages) from the client devices 104, the intermediary system 120, or other devices or service providers. In some embodiments, one or more content servers 106 may be associated with a CDN service provider, an application service provider, or the like.

In operation, one or more of the client devices 104 may be associated with the intermediary system 120. For example, the client device 104 may utilize proxy and caching services provided by the intermediary system 120. A user of the client device 104 may initialize the browser 112 and use the browser 112 to transmit a request for a content page, such as a web page. Due to the client device's 104 association with the intermediary system 120, the request may be transmitted to the intermediary system 120 rather than directly to the content server 106 of the content page. The intermediary system 120 can retrieve the content page from a content server 106 or some other source of the content page, such as a CDN system. The intermediary system 120 may process the content page prior to transmitting it to the client device 104. For example, the intermediary system 120 may utilize the content rendering engine 122 to partially or completely render the page, for example, by obtaining objects embedded in the page from various different content servers 106. The intermediary system 120 may then transmit the rendered content to the client device 104. Various examples of a content rendering engine 122 executing on an intermediary system 120 or other network computing component, and the browser 112 configurations and processing that can facilitate usage of the content rendering engine 122, is described in U.S. patent application Ser. No. 13/174,589, filed Jan. 3, 2013, titled "Remote Browsing Session Management," the disclosure of which is hereby incorporated by reference in its entirety.

The intermediary system 120 may utilize the code analysis module 124 to obtain execution profile data from the client devices 104. These execution profiles may be received from the script engine 114 in the client devices 104. For example, if the client device 104 receives a script from the content rendering engine 122, the script engine 114 at the client device 104 can profile the script and export this profile to the code analysis module 124. The code analysis module 124 can accumulate or otherwise aggregate data obtained from these execution profiles into an aggregate execution profile. In one embodiment, the code analysis module 124 therefore creates an aggregate execution profile for each script, and this aggregate execution profile reflects the accumulated or aggregated execution profiles of multiple users.

The code analysis module 124 can store the received execution profiles and the aggregate execution profile in the script profile data repository 126. This repository 126 may include logical and/or physical computer storage, a database, or the like. In an embodiment, the script profile data repository 126 includes tables or other data structures that map scripts (or representations thereof) to execution profiles. Each script can be represented in the script profile data repository 126 by some unique value, such as a hash of the script, or the like. In one embodiment, the script profile data repository 126 is a key-value data store, such as a non-relational (or NoSQL) data store implemented in a cloud computing platform or infrastructure-as-a-service (IaaS) platform or the like.

Once the code analysis module 124 has received these execution profiles from a sufficient number of client devices 104, or otherwise has aggregated a sufficient amount of data, the code analysis module 124 can begin sending the aggregate execution profile to client devices 104 that subsequently receive the script from the content rendering engine 122 (and/or to devices 104 that have already received the script). The script engine 114 at the client device 104 can import the aggregate execution profile and use this profile to optimize compilation. Advantageously, in certain embodiments, this optimized compilation can have better results than traditional optimization that is based on a single user's interactions with the script. For example, the optimizations may cause more methods, functions, or routines in the script to compile with compiler optimizations.

In another embodiment, the code analysis module 124 compiles the script at the intermediary system 120 using the aggregate execution profile. The code analysis module 124 can either send this compiled version of the script to the client device 104 or can first decompile the compiled version and send the decompiled version to the client device. In either case, the script can execute with increased optimization. Other variations are possible, some examples of which are described in greater detail below.

It should be noted that the script engine 114 can be a modified version of an off-the-shelf or currently-available script engine. For instance, the script engine 114 may be modified to enable importing and/or exporting of execution profiles. The script engine 114 may include a plug-in, dynamic-linked library, or other code module that enhances the script engine's 114 functionality to allow importing and exporting of profiles. In another embodiment, the script engine 114 can be partially rewritten to include this enhanced functionality. In one embodiment, the script engine 114 is a modified version of the V8 JavaScript engine described above. Additional example modifications to off-the-shelf script engines 114 are described below.

In some embodiments, the script profile aggregation and optimization features described herein can also be implemented without the use of the intermediary system 120. For instance, the client devices 104 may communicate directly with the content servers 106 while forwarding script execution profiles to a third party server that aggregates the profiles for subsequent compiler optimizations (see, e.g., FIG. 6). Other embodiments are also described in greater detail below.

III. Example Script Optimization Process

Figure 2:
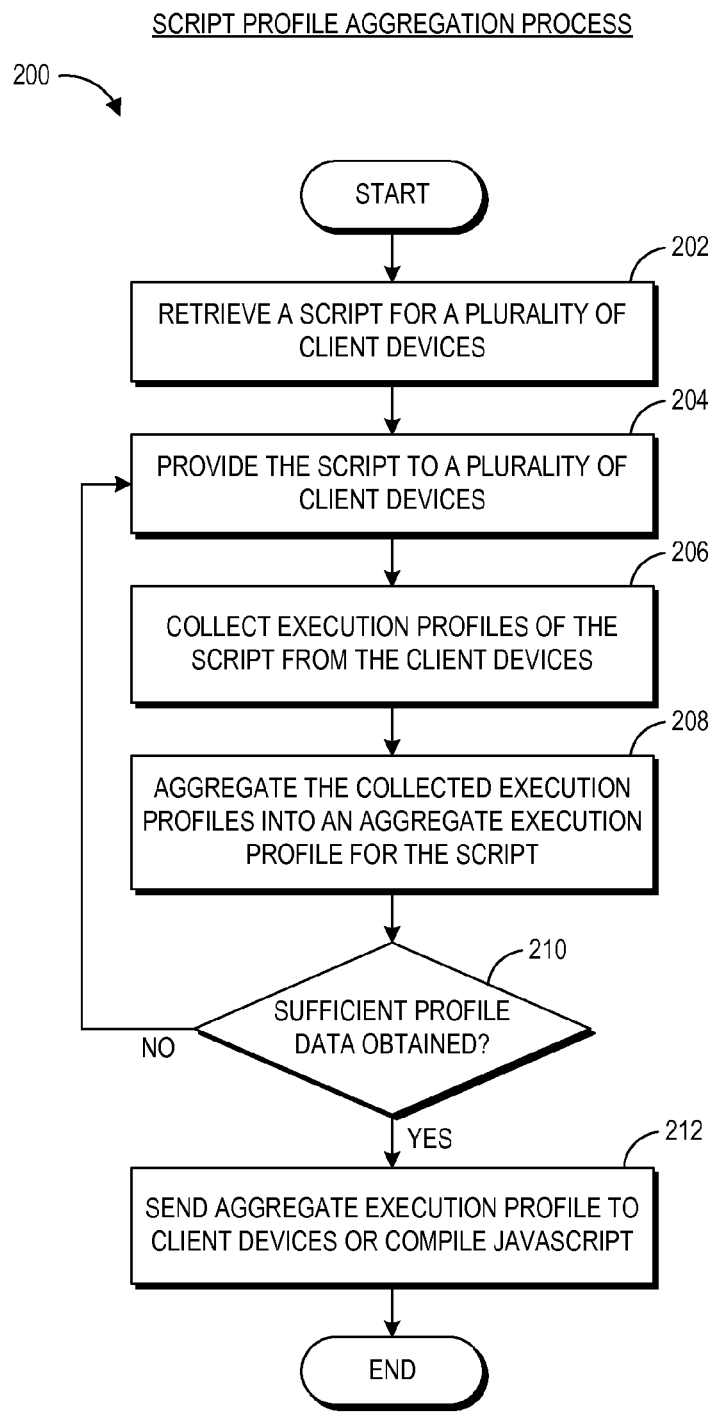
FIG. 2 depicts an embodiment of a script execution profile aggregation process.

FIG. 2 depicts an embodiment of a script profile aggregation process 200. The script profile aggregation process 200 can be implemented by the intermediary system 120 described above. In particular, certain blocks of the process 200 can be implemented by the content rendering engine 122 or the code analysis module 124 of the intermediary system 120. The process 200 need not be implemented by the intermediary system 120 and instead may more generally be implemented by any computing device. However, for convenience, the process 200 will be described in the context of the intermediary system 120.

At block 202 of the process 200, the content rendering engine 122 retrieve a script for a plurality of client devices (e.g., the client devices 104). The script may be a portion of a content page or mobile application requested by the client devices, as described above. Although not shown, in one embodiment, each time the content rendering engine 122 retrieves the script, the content rendering engine 122 can determine whether the script has changed since a previous time obtaining the script. If so, the content rendering engine 122 may direct the code analysis module 124 to discard execution profile data obtained for the script, as this data may be invalid for the changed script. The content rendering engine 122 can determine whether the script has changed by hashing the script and comparing the resulting hash value with a previously stored hash value obtained by hashing a previous version of the script. If the hash values differ, the scripts likely differ to a high degree of probability (which probability depends on choice of hash function). The content rendering engine 122 may instead (or also) examine any hypertext markup language (HTML) header associated with the script to determine whether data in the header indicates that a new version of the script has been received.

At block 204, the content rendering engine 122 provides the script to a plurality of client devices. The content rendering engine 122 provides the script to each client device for which it is requested. At block 206, the code analysis module 124 collects execution profiles of the script from the client devices 104 (or from a subset thereof, e.g., by obtaining a random sample). As described above, the script engine 114 in some or all of the client devices 104 can profile a user's actual usage of the script based on the user's interactions with the script. The resulting execution profiles generated by these script engines 114 can include information regarding which methods or functions were executed by the script, how often these functions were executed, and the amount of time that the functions took to execute, among other data. Further, the execution profiles may also include information about functions or other parts of the script that rarely or never executed, giving clues as to which functions or parts of the script to avoid optimizing. Similarly, the execution profiles may include information on the code path taken by users, including branch behavior of the script. For example, the execution profiles may include information regarding which branches (such as if-then statements, case statements, and switch statements) that were frequently or always followed. This information can also give clues as to which portions of the script to optimize (e.g., the branch that is most commonly selected). For instance, if 85% of the execution profiles indicate that a certain "if" statement was true, it may be beneficial to focus optimization on the Boolean true path of that "if" statement.

The code analysis module 124, at block 208, aggregates the collected execution profiles into an aggregate execution profile for the script. The code analysis module 124 can do so by accumulating related data in the execution profiles. For instance, the code analysis module 124 can accumulate the number of times various users executed or entered the same function in the script. The code analysis module 124 can repeat this process for each function. This aggregate number may be much higher for some functions that would ordinarily be executed a small number of times by individual users. As a result, this number may be used as a clue or data point that suggests that the related functions might benefit from optimization. Similarly, the total execution time for a given function or portion of the script can be accumulated by the code analysis module 124. Alternatively, the number of times that functions were executed or their execution times can be averaged by the code analysis module 124, or other mathematical operations may be performed on such data.

At decision block 210, the code analysis module 124 determines whether sufficient profile data has been obtained from the client devices 104. Once sufficient data has been obtained, the code analysis module 124 can proceed to send the aggregate execution profile for the script or perform script compiling (and associated optimizations) at block 212. The features of block 212 are described in greater detail with respect to subsequent FIGURES. However, if sufficient data is not obtained at block 210, the process 200 can loop back to block 204 (and/or block 202), where the process 200 continues to obtain script execution profiles from client devices 104 to which the script is provided.

Determining whether sufficient profile data has been obtained may be performed in a number of ways. The code analysis module 124 may, for instance, compare the number of execution profiles received with a predetermined threshold to determine whether a sufficient number of profiles have been received. Alternatively, the code analysis module 124 can determine whether a predetermined time period has elapsed prior to aggregating the profiles. In another embodiment, the code analysis module 124 optimizes or attempts to optimize a script until a certain hotness level is achieved for some or all of the methods of the script, such as the highest level of hotness. Once that level is reached, aggregation of the profile data may be considered sufficient.

In another embodiment, sufficiency is determined by determining whether there is convergence in the common code path detected in the aggregate execution profile. As described above, the code analysis module 124 can detect common code paths in the execution profiles and can store this information in the aggregate execution profile. As execution profiles are initially combined to create the aggregate execution profile, the common code path information may change rapidly because different client devices 104 may have entered different functions, branches, or the like. After several execution profiles have been aggregated into the aggregate execution profile, a common pattern may begin to emerge in function calls and/or branch behavior, such that the common code path information may start to change slowly, indicating convergence on a common code path or paths. In another embodiment, the code analysis module 124 determines whether the distribution of usage of the script's functions or branches has reached a stable or convergence point, at which point the code analysis module considers sufficiency to be reached. Moreover, the code analysis module may use any of the sufficiency measures described herein together or in concert to measure sufficiency.

Although aggregation may be considered sufficient, the code analysis module 124 may still continue to aggregate execution profiles in some embodiments. Further, in other embodiments, no check for sufficiency is made, and the code analysis module 124 sends aggregation profiles to the client devices 104 that request content as the aggregation profiles are made.

Furthermore, although the code analysis module 124 may collect data from every client device 104 with which it interacts, in other embodiments the code analysis module 124 samples profile data from a smaller subset of the client devices 104. Sampling profiles may be a more efficient way to obtain profile data than aggregating profile data from all client devices 104. In one embodiment, the code analysis module 124 samples a small portion of client devices 104 initially to determine whether most or all devices are taking the same (or substantially same) execution path. If most or all devices are taking the same (or substantially same) execution path, there may be little to no benefit in sampling more, as the code analysis module 124 knows which execution path to optimize.

Conversely, if in the small sample of execution profiles from client devices 104, the execution path is not converging, the code analysis module 124 may increase the sampling rate or percentage of client devices 104 being sampled until some convergence or stabilization in execution path is reached. Thus, in one example scenario, the code analysis module 124 may sample about 10% of client devices 104, ramp up to sampling about 50% of client devices 104 after not detecting convergence, and ramp down to sampling 5% (or even 0%, e.g., no longer collecting data) after reaching some measure of convergence or stability in the execution path.

IV. Example Script Optimization State Flows

Figure 3:
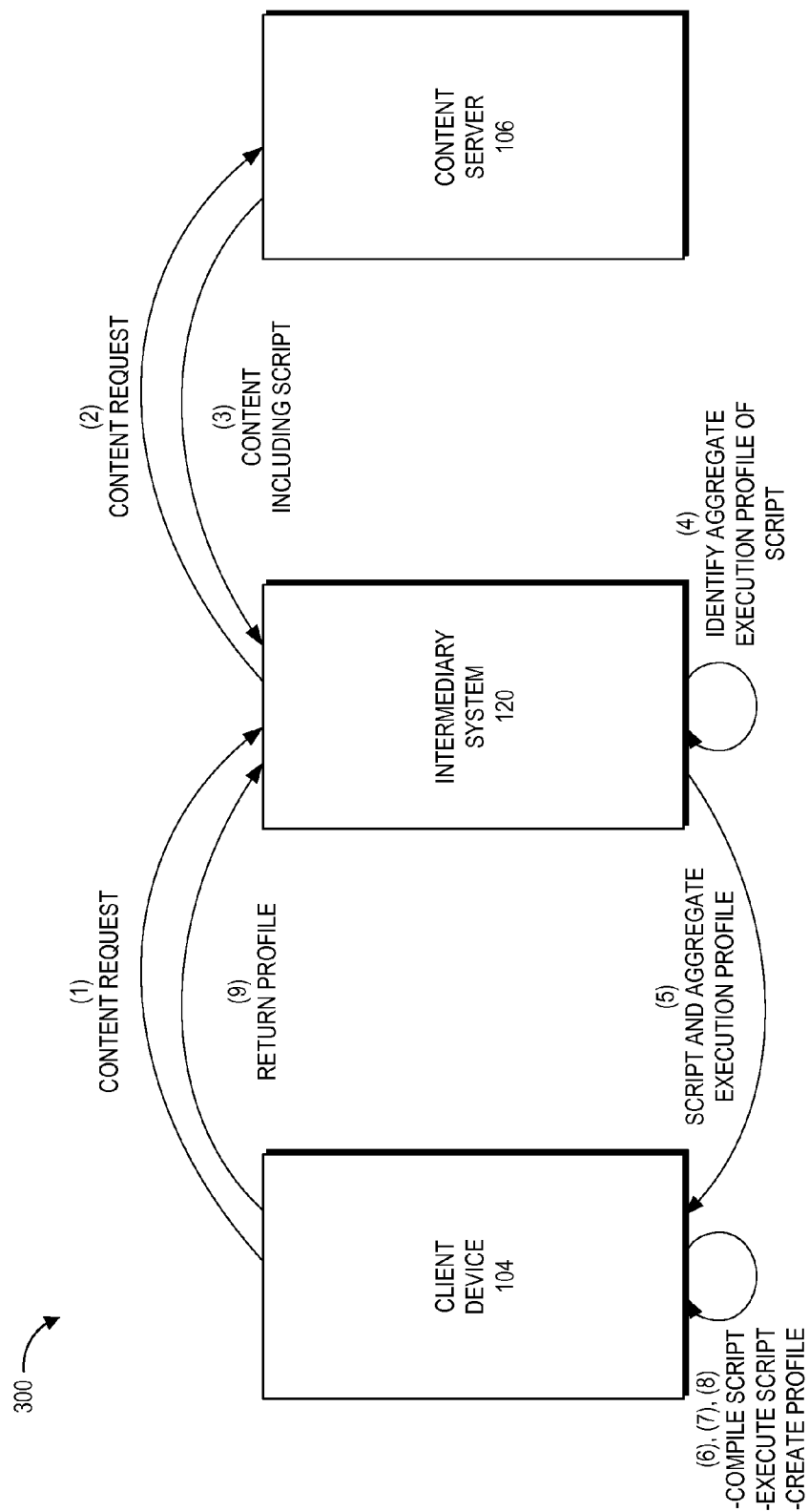
FIG. 3 depicts an embodiment of a state flow diagram in which an aggregate execution profile of a script is provided to a client device.
Figure 4:
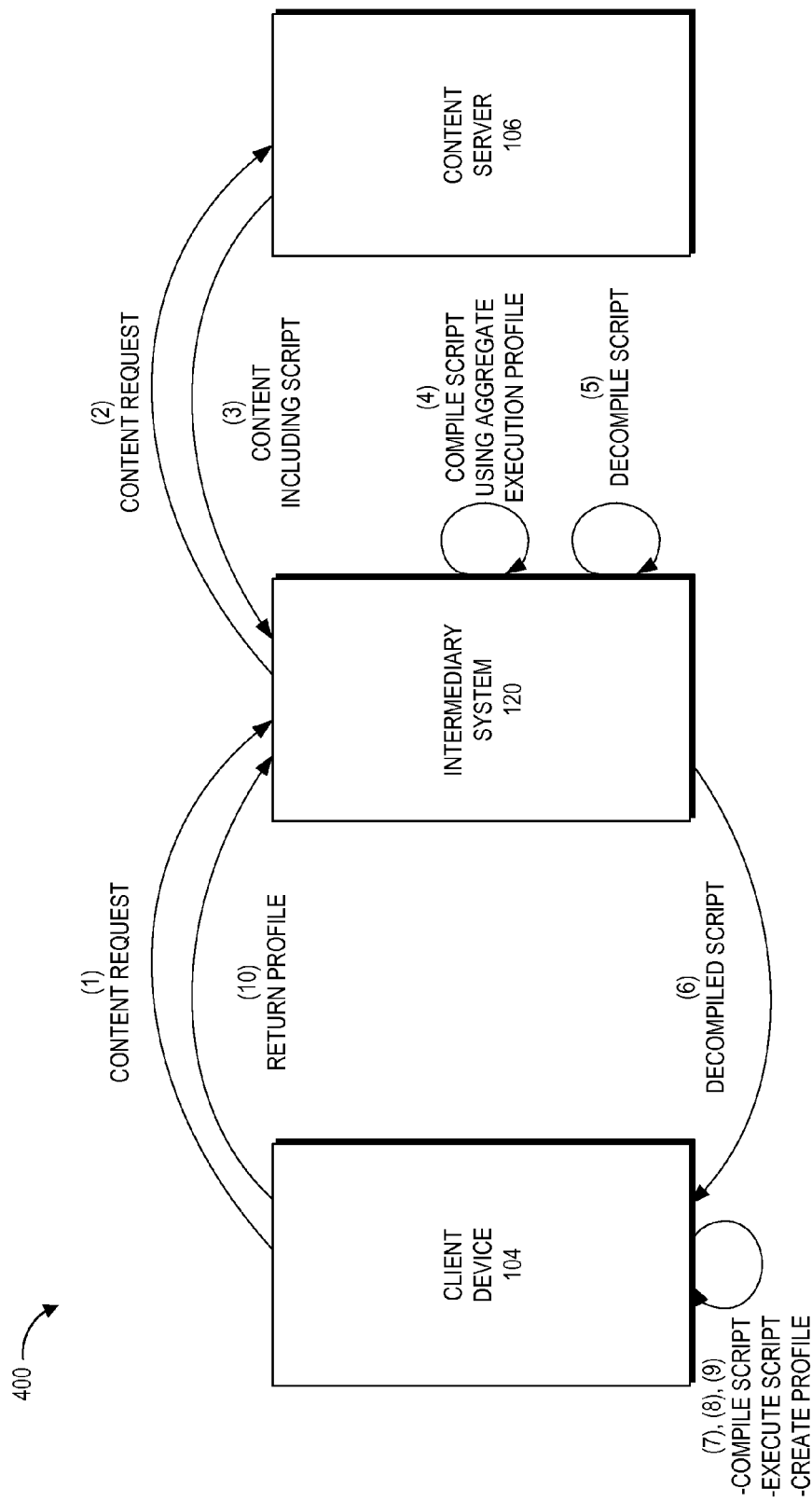
FIG. 4 depicts an embodiment of a state flow diagram in which a decompiled script is provided to a client device.
Figure 5:
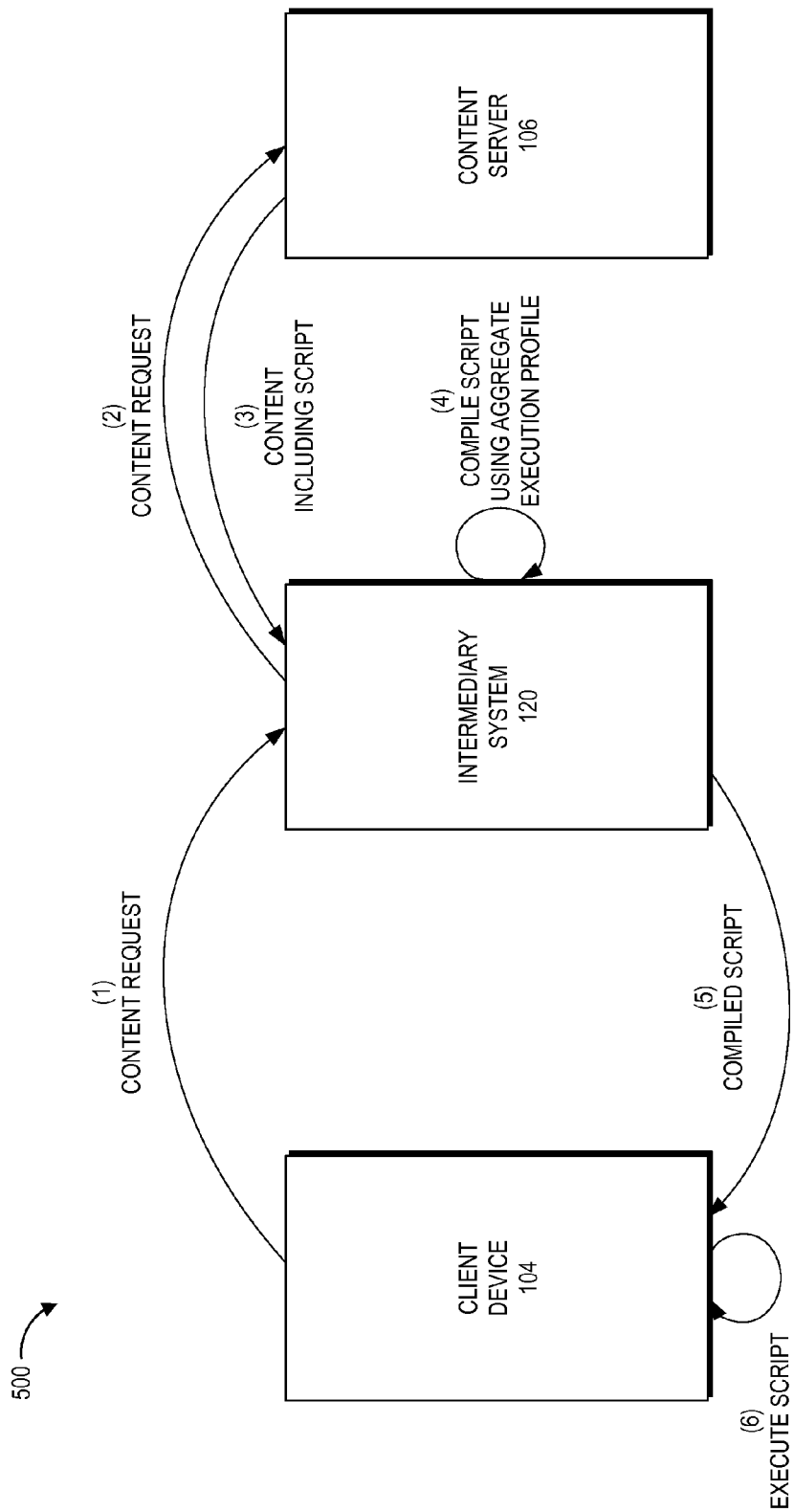
FIG. 5 depicts an embodiment of a state flow diagram in which a compiled script is provided to a client device.
Figure 6:
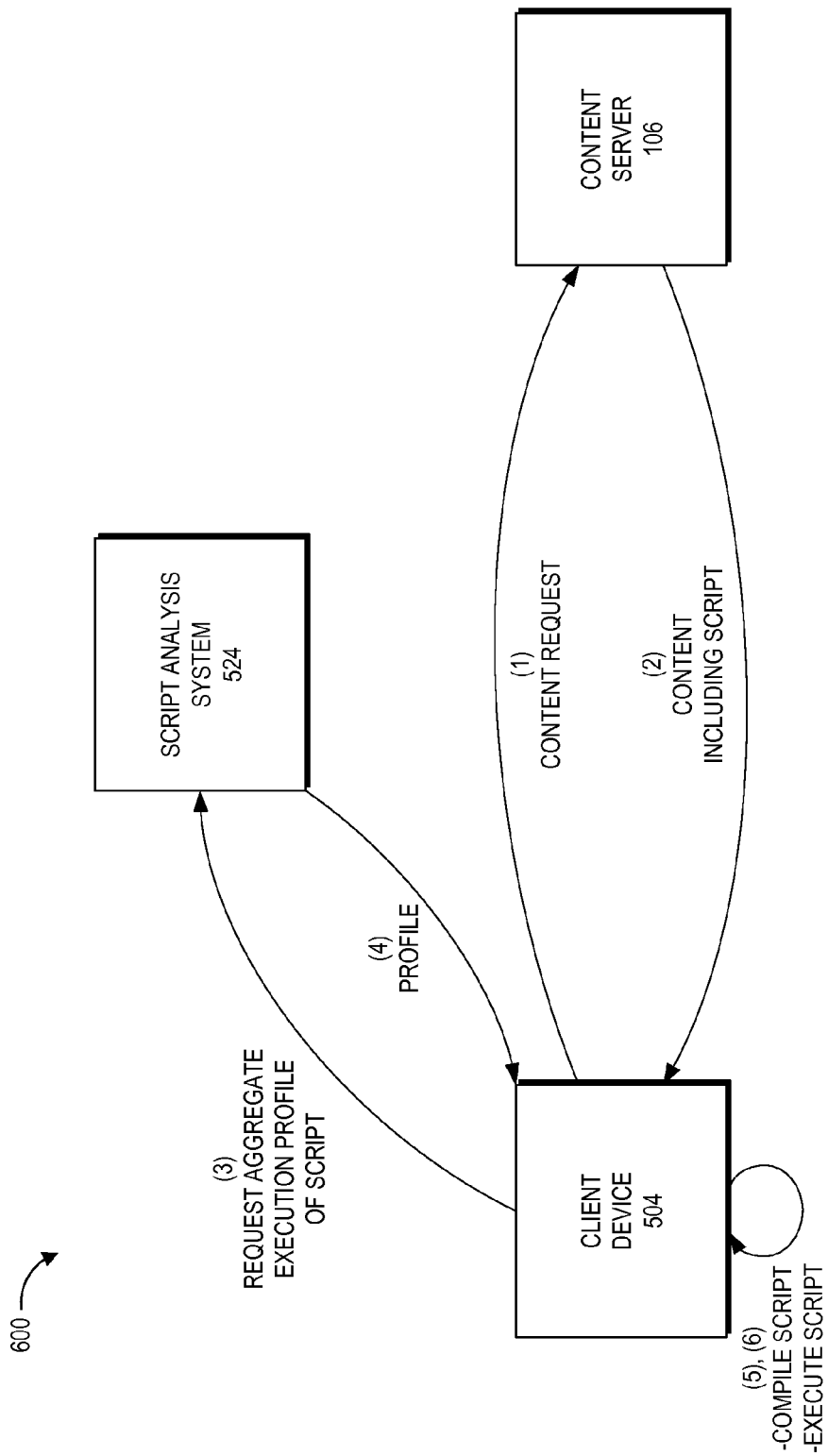
FIG. 6 depicts an embodiment of a state flow diagram in which an aggregate execution profile of a script is provided to a client device.

FIGS. 3 through 5 depict various state flow diagrams in which the client device 104 requests content from the intermediary system 120, which in turn retrieves the content including a script from the content server 106. Each state flow diagram then focuses on how example embodiments of the intermediary system 120 interacting with the client device 104 to provide enhanced compilation of the script. For ease of illustration, further details regarding rendering and transmitting the remainder of the content are not shown. In addition, FIG. 6 depicts another embodiment of a state flow diagram for facilitating enhanced compilation of scripts that does not include an intermediary system 120. Each of the state flow diagrams in FIGS. 3 through 6 takes place after an aggregate execution profile is obtained for a script using the process 200 of FIG. 2.

Turning to FIG. 3, an embodiment of a state flow diagram 300 is depicted in which an aggregate execution profile of a script is provided to a client device 104. At state 1, the client device 104 requests content from the intermediary system 120. The intermediary system 120 in turn requests the content at state 2 from the content server 106. The content server 106 returns the content, including a script, at state 3 to the intermediary system 120.

At state 4, the intermediary system 120 identifies an aggregate execution profile associated with the script, for example, from the script data repository 126. If such a profile exists, the intermediary system 120 sends the aggregate execution profile to the client device 104 along with the script at state 5. At state 6, the client device 104 compiles the script with the aggregate execution profile using, for example, the script engine 114. The client device 104 then executes the compiled script at state 7. The client device 104 can also create another execution profile at state 8, based on the user's execution of the script, and can send this execution profile to the intermediary system at state 9. The intermediary system 120 can then incorporate the execution profile from the client device 104 in the aggregate execution profile.

In some embodiments, the script engine 114 of the client device 104 includes decision tree logic or the like that determines whether an aggregate execution profile has been received. If so, the client device 104 can use the aggregate execution profile to initiate compiler optimization instead of generating its own profile. However, in another embodiment, the client device 104 generates its own profile anyway and uploads this profile to the intermediary system 120 for further aggregation with the existing aggregate execution profile by the code analysis module 124. Thus, the code analysis module 124 can continue to aggregate and improve the aggregate execution profile based on information obtained from the client device 104. In still another embodiment, the client device 104 still performs its own execution profile but appends or otherwise aggregates the aggregate execution profile with its own, user-specific execution profile to create a custom aggregate execution profile. The script engine 114 can compile the script using this custom aggregate execution profile instead of the aggregate execution profile received at state 5.

In an embodiment, the script engine 114 in the client device 104 uses the aggregate execution profile to optimize compilation by identifying methods or functions or other parts of the script code that execute frequently, e.g., that have a certain hotness as described above. The client device 104 can then optimize these parts of the script during compilation. Advantageously, since the optimization of this compilation is performed based on the aggregate execution profile, optimization can be performed on most, more, or all of the script code to provide faster script code than might be obtained from an execution profile generated by a single client device 104.

In another embodiment, the intermediary system 120 can strip portions of the script that the intermediary system 120 has detected will never be executed or will likely not be executed prior to sending the script to the client device 104. The code path information contained in the aggregate execution profile can indicate to a high probability whether certain functions or branches of the script will never be executed based on aggregate behavior of many users. Stripping these portions of the script out of the script can beneficially reduce the network bandwidth consumption of the script's transmission to the client device 104 and can reduce the compile, execution, and/or load time of the script at the client device 104.

FIG. 4 depicts an embodiment of a state flow diagram 400 in which a decompiled script is provided to a client device 104. As above, at state 1, the client device 104 requests content from the intermediary system 120. The intermediary system 120 in turn requests the content at state 2 from the content server 106. The content server 106 returns the content, including a script, at state 3 to the intermediary system 120.

However, instead of sending an aggregated execution profile of the script to the client device 104, the intermediary system 120 instead compiles the script using the aggregate execution profile at state 4. At state 5, the intermediary system 120 decompiles the script. The resulting decompiled script may be more optimized than the script originally received at state 3. This increased optimization may be due in part to compilation of the script using the aggregate execution profile, which may indicate which portions (e.g., functions or subparts thereof) of the script are never logically executed. The compiler, when optimizing the script code, can remove or discard these portions of the code that are never logically executed. Some examples of code that may never be executed include debug code used during development of the script that now cannot logically be reached and branches of conditional statements that can never logically be reached. Further, the compiled code may also be optimized based on the other benefits of the aggregate execution profile described above.

The decompiled script is sent by the intermediary system 120 to the client device 104 at state 6. One advantage of sending this compiled and then decompiled code is that it may also be smaller in size, due to the removed code. Thus, transmission may consume less bandwidth and may be accomplished faster. The client device 104 can compile and execute the script at states 7 and 8, respectively. Further, as above with respect to FIG. 3, the client device 104 can also create another execution profile at state 9, based on the user's execution of the script, and can send this execution profile to the intermediary system at state 10. The intermediary system 120 can then incorporate the execution profile from the client device 104 in the aggregate execution profile.

In an embodiment, when compiling the script, the client device 104 can perform additional optimizations. In another embodiment, however, the client device 104 skips these optimizations since optimizations were initially performed by the intermediary system 120 when compiling the script at state 5. Skipping these optimizations can save compile time in some embodiments.

In an embodiment, the server-side compilation shown in FIG. 4 can compile just a part of the script that the client devices 104 tend to not focus on optimizing to reduce compile time in the intermediary system 120. If the aggregate execution profile indicates that a certain method is executed very frequently on any given individual client device 104, the intermediary system 120 can leave that method unoptimized and uncompiled, as the client device 104 will likely optimize that method. Conversely, the intermediary system 120 can focus on optimizing and compiling methods that tend not to be frequently executed on any given individual client device 104 because otherwise, the client device 104 might not optimize those methods. As an example, a script-based video game may include an initialization portion and a main game loop. The main game loop may execute frequently, such that the intermediary system 120 can have a level of confidence that the client device 104 will likely optimize that portion of the script. Conversely, the initialization portion may be executed much less frequently, and the intermediary system 120 can compile and optimize that portion while leaving the rest of the script uncompiled.

FIG. 5 depicts an embodiment of a state flow diagram 500 in which a compiled script is provided to a client device 104. The state flow diagram 500 proceeds as the state flow diagram 400 until state 5, where instead of decompiling the compiled code and sending the decompiled code to the content device 104, the intermediary system 120 sends the compiled code directly to the client device 104. The client device 104 can then execute the compiled script.

Thus, in FIG. 5, the client device 104 can skip the compilation process and thereby execute the script faster. However, the browser 112 of the client device 104 may be modified to expect to receive the compiled script instead of the script source code.

FIG. 6 depicts an embodiment of a state flow diagram 600 in which an aggregate execution profile of a script is provided to a client device 504 without using an intermediary system 120. The client device 504 can have all the functionality of the client device 104 described above, as well as additional functionality described herein.

At state 1, the client device 504 sends a content request directly to the content server 106. The content server 106 responds at state 2 with the content, which includes a script. At state 3, the client device 504 requests an aggregate execution profile of the script from a script analysis system 524. In one embodiment, the browser in the client device 504 is modified to request the aggregate execution profile at state 3 in response to receiving the script at state 2.

The script analysis system 524 can include all of the functionality of the code analysis module 124 described above but may be implemented as an independent system other than the intermediary system 120. The script analysis system 524 may also implement the process 200 of FIG. 2 to obtain execution profiles from a plurality of client devices 504 and aggregate these profiles into an aggregate execution profile.

At state 4, the script analysis system 524 provides the aggregate execution profile to the client device 504. As in FIG. 3, the client device 504 can use the aggregate execution profile to compile and execute the script at states 6 and 7.

Alternatively, the client device at state 3 can provide the script to the script analysis system 524, which can compile the script using the aggregate execution profile and send either the compiled version or a decompiled version thereof to the client device 504. Thus, in certain embodiments, the state flow diagram 600 of FIG. 6 acts as a pull model, with the client device 504 pulling either aggregate execution profile information or optimized script code from the script analysis system 524. In contrast, the state flow diagrams 300-500 of FIGS. 3 through 5 operate as push models, with the intermediary system 120 providing either aggregate execution profile information or optimized script code to the client device 104.

V. Example Browser User Interfaces

Figure 7:
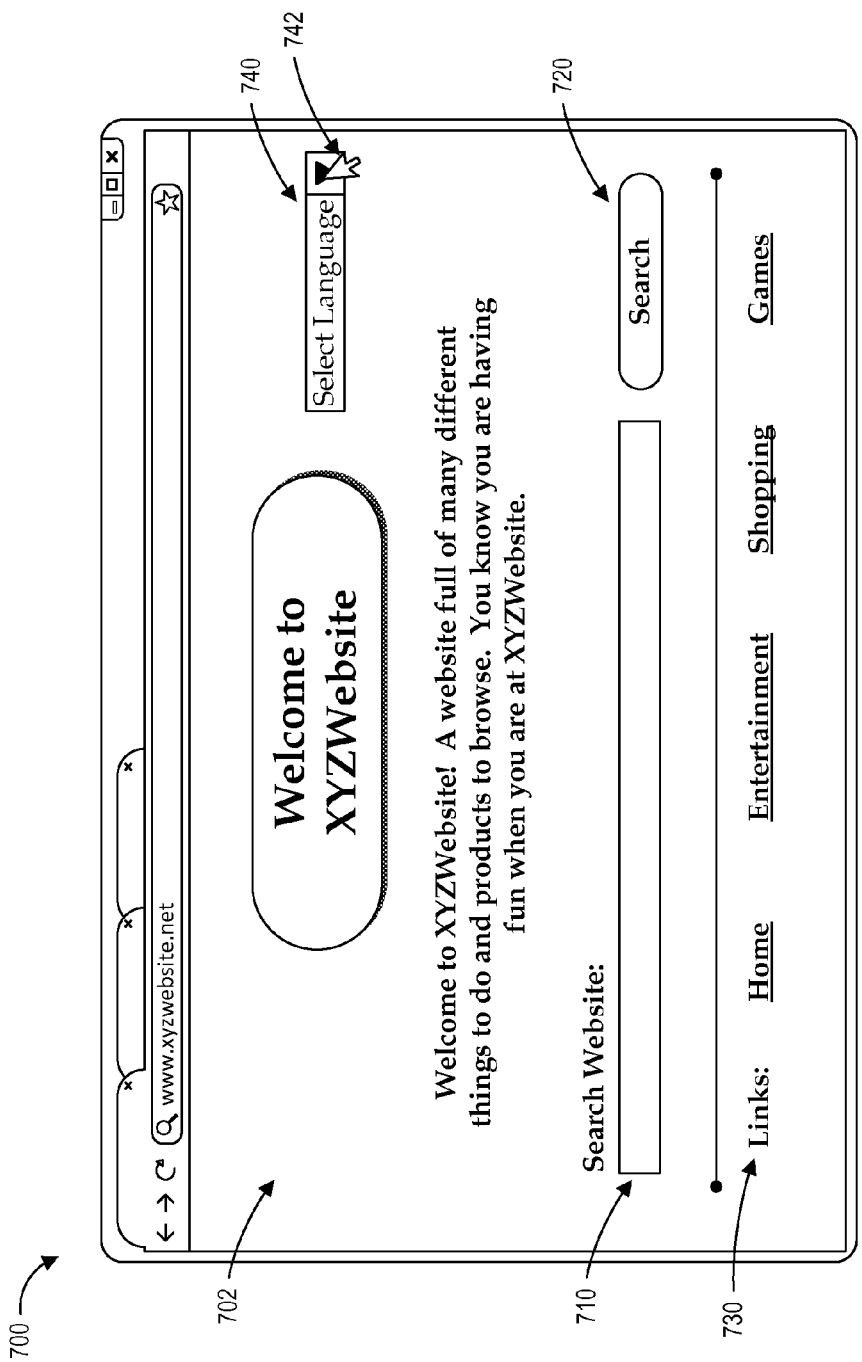
FIGS. 7 and 8 depict embodiments of example browser user interfaces that may implement any of the scripts described herein.

FIG. 7 depicts an embodiment of an example browser user interface 700 that may implement any of the scripts described herein. The browser user interface 700 includes a content page 702 that further includes example user interface controls 710-730, any number of which can trigger a script associated with the user interface 700 to be executed. In the depicted embodiment, the controls 710-730 include a text box control 710, a search button 720, and links 730. User selection of any of these controls 710-730 can cause a script embedded in the content page 702 to execute and perform any of a variety of actions, such as loading a new page, making a dynamic modification to the content page 702, bounds-checking input values (e.g., in the text box 710), and so forth. Advantageously, in certain embodiments, the script or scripts executed can be optimized or improved using any of the techniques described above.

Figure 8:
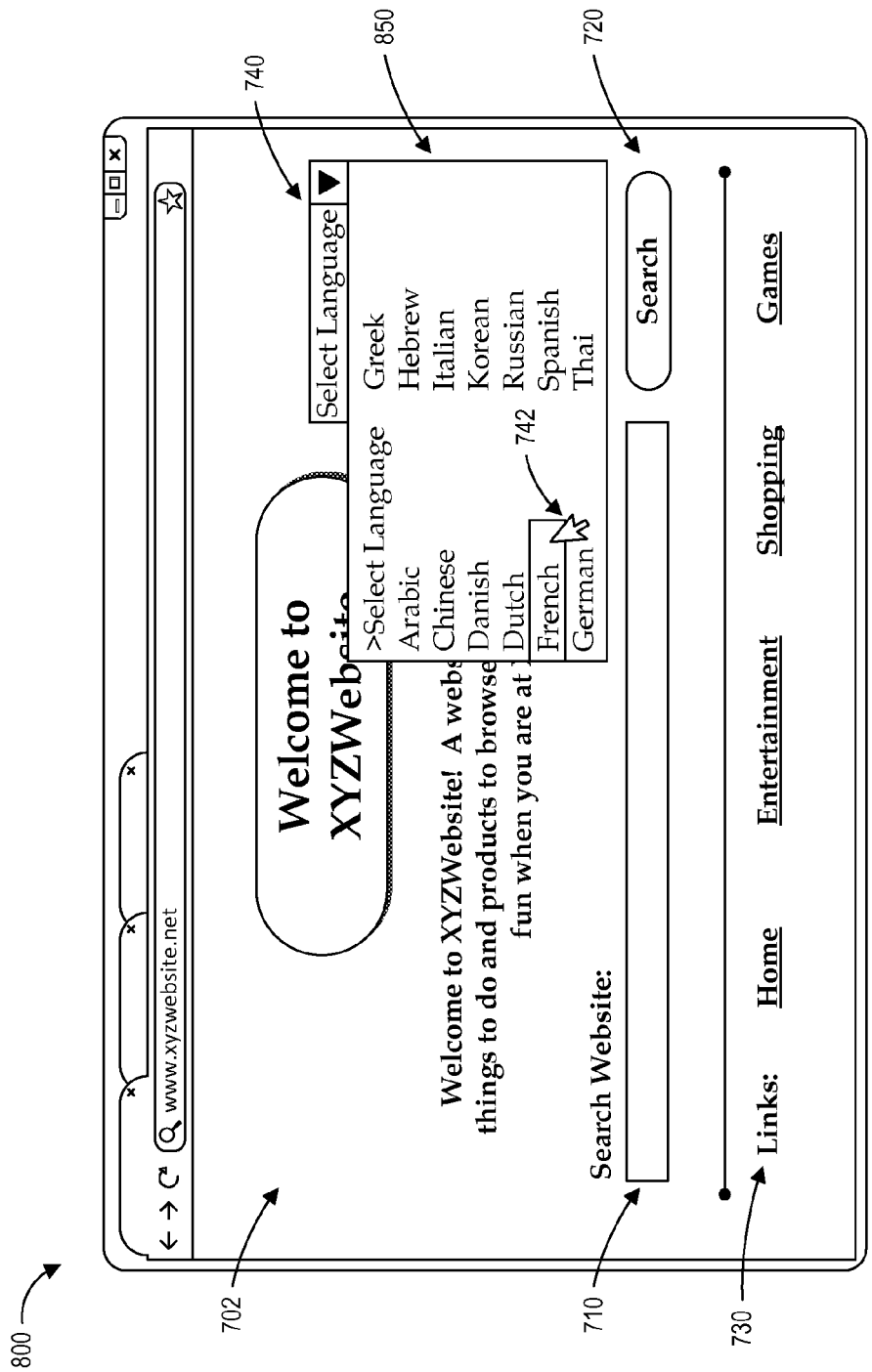

As an example, a select box control 740 is shown with the text "Select Language." A user can select the select box control 740 using a mouse cursor 742 (or with the user's finger on a mobile device, without a cursor) to cause the select box control 740 to expand. Instead of using the standard HTML select box, in an embodiment, the browser user interface 700 can use a custom select box based on a script such as JavaScript to output a more full-featured select box. Thus, for example, user selection of the select box control 740 can cause a menu 850 such as that shown in a browser user interface 800 of FIG. 8 to be displayed. The menu 850 is wider, being double-columned, than a standard HTML text box, and includes languages that may be selected to cause the content page 702 to be translated into the selected language. In one embodiment, the code analysis module 124 can determine from aggregate execution profiles that users frequently select the select box control 740 and select a specific language in a particular geographic region. The content rendering engine 122 can use this information to optimize the execution of this script.

Further, the content rendering engine 122 can use this information to cause the content page 702 to automatically select the desired language and translate the page, for example, using any of the content page profiling techniques described below.

VI. Content Page Profiling

As described, profiling can be performed for code other than scripts. For example, code profiling can be done to identify execution paths of browser code, such as HTML code, in addition to or instead of script code. It may be useful, for instance, to determine which common browsing actions a plurality of users take so as to enable those actions to be taken beforehand by pre-rendering a content page.

Referring again to FIG. 1, as mentioned above, the client device 104 can also include a page profiler 116. The page profiler 116 may include hardware and/or software for profiling user browsing interactions with respect to one or more content pages. The page profiler 116 may be integral with the browser 112 (e.g., as a plug-in) or may be a separate component that communicates with the browser 112. The page profiler 116 can identify user interactions with a content page provided by the intermediary system 120 or a content server 106, including interactions such as selection of a link, expansion of a menu, scrolling of the content page, playing a video, filling at least a portion of a form, expanding a select box, or interaction with a script to perform any of these actions or others. More generally, the page profiler 116 can identify an execution path of the client device 104 based on the browsing actions of a user. The execution path may include a click path taken by a user. As an example, the execution path might include information about a user clicking a first link, then expanding a menu and selecting a second link from the menu, followed by the user scrolling to the bottom of the page.

The page profiler 116 can provide this browsing profile data to the code analysis module 124 of the intermediary system 120. The code analysis module 124 can aggregate this profile data to produce an aggregate execution profile or aggregate browsing profile for a content page, much like the aggregate script execution profiles described above. In an embodiment, this aggregate browsing profile can include information on common execution paths taken by the client devices 104, the number or frequency of user browse interactions with the content page, and so forth. The code analysis module 124 can perform sampling, similar to any of the sampling techniques described above, to collect profile data from a portion of the client devices 104, rather than all devices 104, in some embodiments.

The content rendering engine 122 can use the aggregate browse profile to modify the content page to reflect a common browse interaction or execution path in response to the content page being requested by one of the client devices 104. Thus, for example, if the aggregate browsing profile includes a common execution path taken by many client devices 104 such as expanding a particular menu, the content rendering engine 122 can modify the code of the content page to expand the menu and send the modified content page to the requesting client device 104. In another example embodiment, pre-selection of a link by the content rendering module 122 causes the content rendering module 122 to fetch the linked-to content page from the content server 106 and supply this linked-to content page as the modified page in place of the originally-requested content page. As a result of modifying the page (or fetching a linked-to page), the content rendering engine 122 can enable users to reach more relevant content in the modified content page faster than if the content rendering engine 122 were to send the unmodified content page to the client device 104.

As another example, users may access a content page and commonly scrolling immediately to a bottom portion of the page. The code analysis module 124 can identify this common scroll point as, for example, a common X (horizontal), Y (vertical) position (or just Y position) taken by users. The content rendering engine 122 can subsequently modify the content page to reflect this common scroll point, such that the browser 112 of the client device 104 receiving the modified content page scrolls immediately to the common scroll point.

In one embodiment, the content rendering engine 122 can be said to pre-render the content page to create any of the modifications described above. Such modifications can speed up the user browsing experience and may be particularly beneficial for mobile devices, although any device or user may benefit from faster loading of relevant content.

The content rendering engine 122 can use thresholding techniques to determine which execution paths to take when modifying a content page. For instance, the content rendering engine 122 can determine whether a threshold percentage of users take a certain execution path. If the threshold is met, the content rendering engine 122 can modify the content page to match the execution path (or at least a portion thereof). The threshold may be a relatively high percentage for some browse actions and relatively lower percentage for other browse actions. Some browse actions, like selecting a link to fetch a new content page, may have a higher threshold than expanding a menu to show a sub-menu, for instance. In some embodiments, more major modifications to the page may have a higher threshold than more minor modifications to a page. Some examples of major modifications might include, for example, selecting of links, selecting of menu options, and the like, while some examples of minor actions can include playing a video upon loading, filling commonly-filled fields of a form with generic information, and so on. However, any of the above user browse actions can be considered either major or minor modifications in different scenarios, which may depend on the type of content page being modified.

Figure 9:
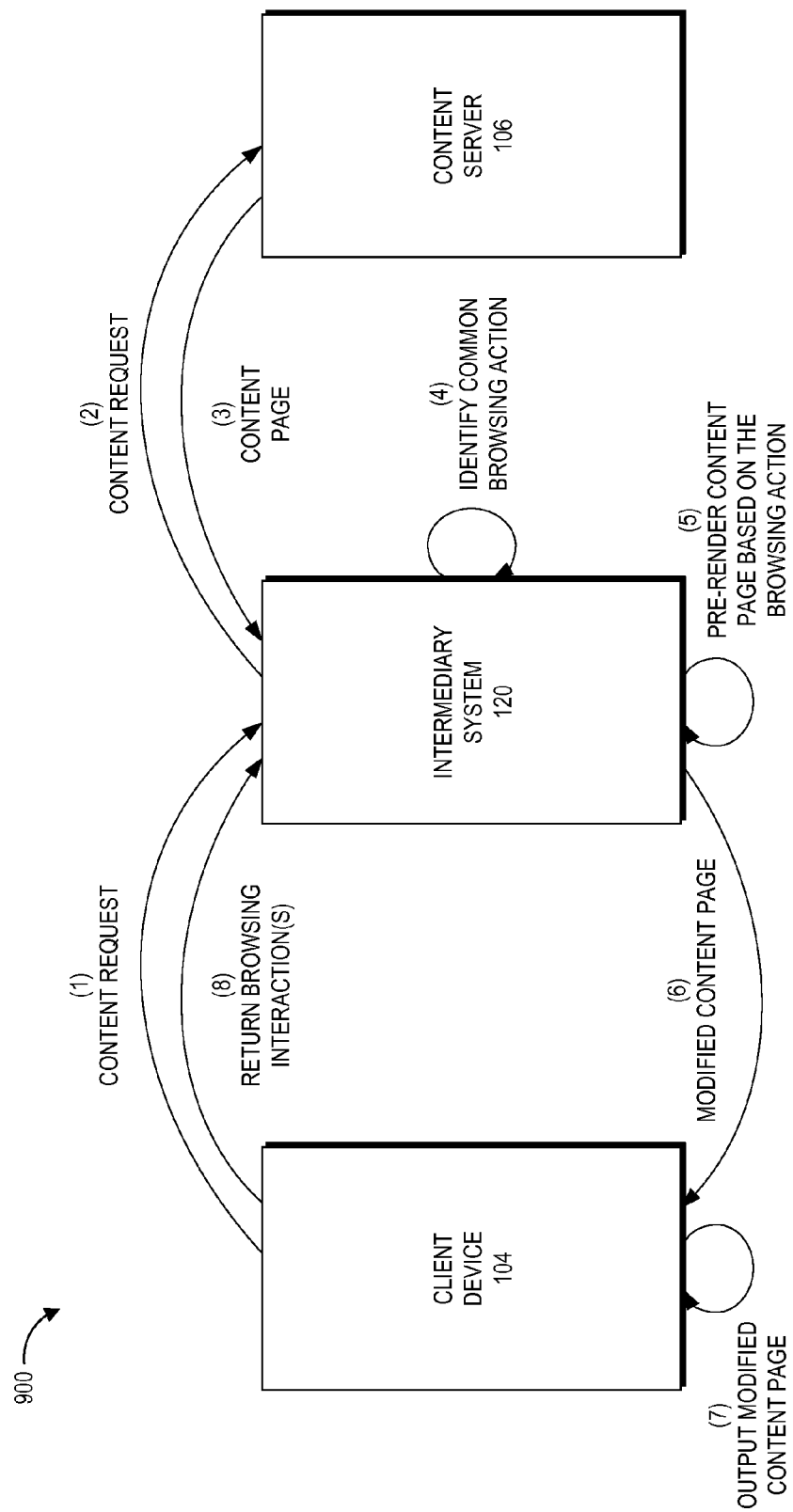
FIG. 9 depicts an embodiment of a state flow diagram in which a content page is modified based on user browsing interactions.

FIG. 9 depicts an embodiment of a state flow diagram 900 in which a content page is modified based on user browsing interactions. At state 1, the client device 104 requests a content page from the intermediary system 120. The intermediary system 120 in turn requests the content page at state 2 from the content server 106. The content server 106 returns the content page at state 3 to the intermediary system 120. The content page may or may not include a script.

At state 4, the intermediary system identifies one or more common browsing interactions based on aggregate browsing data collected from a plurality of client devices 104. The intermediary system 120 can then pre-render the content page based on the browsing interaction to produce a modified content page at state 5. The intermediary system 120 then sends the modified content page to the client device at state 6. The client device 104 can then output the modified content page at state 7, which may include performing other rendering of the page.

Figure 10:
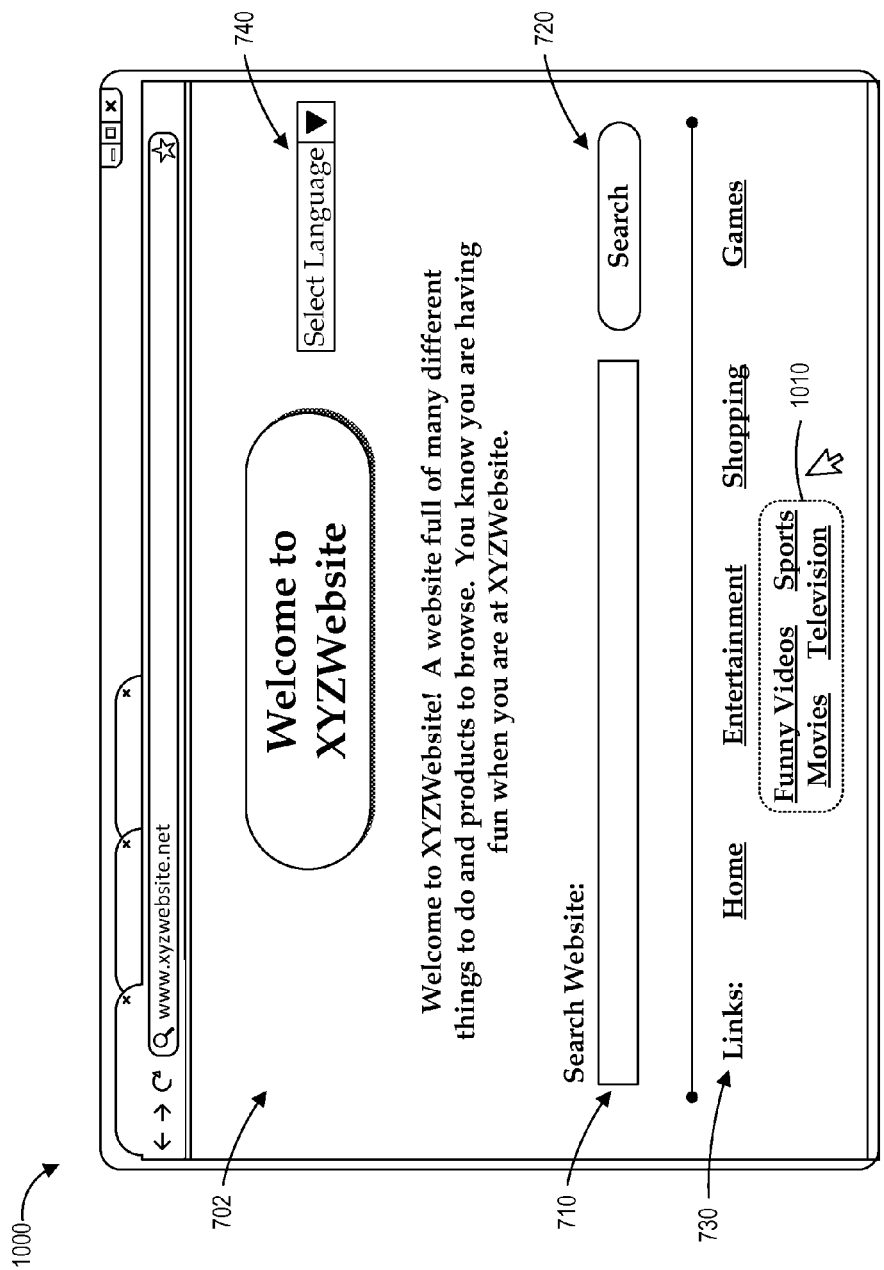
FIG. 10 depicts an example browser user interface that may implement the modified content page of FIG. 9.

FIG. 10 depicts an example browser user interface 1000 that may implement the modified content page described above with respect to FIG. 9. The browser user interface 1000 includes all the features of the browser user interface 700 of FIG. 7. In particular, the browser user interface 1000 is an embodiment of a modified content page, where the original content page is the browsing user interface 700 of FIG. 7.

In an embodiment, the code analysis module 124 of FIG. 1 may identify a common user browse action with respect to the browsing user interface 700 of FIG. 7, in that most users initially select the "Entertainment" link 730 upon loading of the browsing user interface 700. The content rendering engine 122 can therefore modify the code of the browsing user interface 700 to cause the browsing user interface 1000 to already have this link selected upon loading. As a result, in this particular example embodiment, the browsing user interface 1000 includes a listing of sub-links 1010 below the "Entertainment" link 730 upon loading of the browsing user interface 1000, as if the user had pre-selected the "Entertainment" link 730 without actually requiring the user to do so.

VII. Terminology

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A method of facilitating enhanced script execution performance, the method comprising:
   collecting execution profiles of a script from a plurality of client devices;
   aggregating the collected execution profiles, said aggregating comprising (1) identifying portions of the script that cannot execute in a compiled script and (2) producing an aggregate execution profile of the script;
   receiving a request from a first client device to access a network resource that is associated with the script;
   retrieving the script from a content server;
   providing the script to the first client device; and
   providing the aggregate execution profile to the first client device to enable the first client device to compile the script, using the aggregate execution profile, to produce the compiled script that excludes the portions of the script that cannot execute;
   wherein at least said aggregating and said providing the aggregate execution profile to the first client device are implemented by a computer system comprising computer hardware.

2. The method of claim 1, wherein said aggregating the collected execution profiles comprises accumulating data in the collected execution profiles.

3. The method of claim 2, wherein said accumulating data comprises accumulating a number of times users accessed portions of the script.

4. The method of claim 3, wherein said accumulating is configured to emphasize the portions of the script for the purpose of triggering compiler optimization.

5. The method of claim 1, further comprising transmitting the script to the plurality of client devices with an intermediary system.

6. A system for facilitating enhanced script execution performance, the system comprising:
   a code analysis module comprising computer hardware, the code analysis module configured to:
      collect execution profiles of a code module from a plurality of client devices, and
      aggregate the collected execution profiles to (1) identify portions of the script that cannot execute in a compiled script and (2) produce an aggregate execution profile of the code module; and
      provide the aggregate execution profile to a first client device to enable the first client device to compile the code module, using the aggregate execution profile, to produce the compiled script that excludes the portions of the script that cannot execute.

7. The system of claim 6, wherein the code analysis module is further configured to aggregate the collected execution profiles by at least determining a common code path in the collected execution profiles.

8. The system of claim 7, wherein the code analysis module is further configured to determine the common code path by determining which functions or code branches are commonly executed.

9. The system of claim 8, wherein the code analysis module is further configured to accumulate the data by at least emphasizing the portions of the code module for the purpose of triggering compiler optimization.

10. The system of claim 6, wherein the code analysis module is implemented on an intermediary system configured to act as a proxy for requests from the first client device to receive content.

11. The system of claim 10, further comprising a content rendering engine configured to receive a request for content from the first client device, to retrieve the requested content and the code module from a content server, and send the code module to the first client device.

12. The system of claim 6, wherein the code analysis module is further configured to provide the aggregate execution profile of the code module to the first client device without providing the code module to the first client device.

13. A method of facilitating enhanced script execution performance, the method comprising:
    collecting execution profiles of a script from a plurality of client devices;
    aggregating the collected execution profiles, said aggregating comprising (1) identifying portions of the script that cannot execute in a compiled script and (2) producing an aggregate execution profile of the script;
    receiving a request from a first client device to access a network resource that is associated with the script;
    accessing the script from a content server;
    compiling the script to produce the compiled script, said compiling comprising using the aggregate execution profile of the script to optimize compilation of the script by at least excluding the portions of the script that cannot execute from the compiled script;
    decompiling the compiled script to produce a modified script; and
    providing the modified script to the first client device.

14. The method of claim 13, wherein said aggregating the collected execution profiles comprises accumulating data in the collected execution profiles.

15. The method of claim 14, wherein said accumulating data comprises accumulating a number of times users accessed portions of the script.

16. The method of claim 15, wherein said accumulating is configured to emphasize the portions of the script for the purpose of triggering compiler optimization.

17. The method of claim 13, wherein said collecting comprises sampling a portion of a set of client devices that access the script.

18. A system for facilitating enhanced script execution performance, the system comprising:
    a code analysis module configured to:
        collect execution profiles of a script from a plurality of client devices, and
        aggregate the collected execution profiles to (1) identify portions of the script that cannot execute in a compiled script and (2) produce an aggregate execution profile of the script; and
    a content rendering engine comprising computer hardware, the content rendering engine configured to:
        access the script;
        compile the script to produce a compiled script, said compiling comprising using the aggregate execution profile of the script to optimize compilation of the script by at least excluding the portions that cannot execute from the compiled script;
        decompile the compiled script to produce a modified script; and
        provide the modified script to a first client device.

19. A system for facilitating enhanced script execution performance, the system comprising:
    a code analysis module configured to:
        collect execution profiles of a script from a plurality of client devices, and
        aggregate the collected execution profiles to produce an aggregate execution profile of the script, the aggregate execution profile comprising code path information that indicates which portions of the script that are not likely to be executed; and
    a content rendering engine comprising computer hardware, the content rendering engine configured to:
        remove the portions of the script not likely to be executed from the script to produce a first modified script;
        compile the first modified script to produce a compiled script;
        decompile the compiled script to produce a second modified script; and
        provide the second modified script to a first client device.

20. The system of claim 19, further comprising providing the aggregate execution profile to the first client device.

* * * * *